(12) United States Patent
Salsich et al.

(10) Patent No.: US 12,273,982 B2
(45) Date of Patent: *Apr. 8, 2025

(54) INDUCTION HEATING EXTENSION CABLES INCLUDING CONTROL CONDUCTORS

(71) Applicant: ILLINOIS TOOL WORKS INC., Glenview, IL (US)

(72) Inventors: Anthony V. Salsich, Appleton, WI (US); Paul Verhagen, Appleton, WI (US)

(73) Assignee: ILLINOIS TOOL WORKS INC.

( * ) Notice: Subject to any disclaimer, the term of this patent is extended or adjusted under 35 U.S.C. 154(b) by 0 days.

This patent is subject to a terminal disclaimer.

(21) Appl. No.: 17/844,423

(22) Filed: Jun. 20, 2022

(65) Prior Publication Data

US 2023/0147332 A1 May 11, 2023

Related U.S. Application Data

(63) Continuation of application No. 15/928,272, filed on Mar. 22, 2018, now Pat. No. 11,399,415, which is a
(Continued)

(51) Int. Cl.
*H05B 6/06* (2006.01)
*H01B 7/30* (2006.01)
(Continued)

(52) U.S. Cl.
CPC .............. *H05B 6/06* (2013.01); *H01B 7/303* (2013.01); *H01B 9/003* (2013.01); *H01B 9/02* (2013.01);
(Continued)

(58) Field of Classification Search
CPC .................. H04B 3/542; H04B 3/546; H04B 2203/5487; H01B 7/303; H01B 9/02; H01B 9/003
See application file for complete search history.

(56) References Cited

U.S. PATENT DOCUMENTS

| 7,208,684 B2 | 4/2007 | Fetterolf, Sr. et al. |
| 2004/0084443 A1 | 5/2004 | Ulrich |

(Continued)

FOREIGN PATENT DOCUMENTS

| WO | 2016084112 | 6/2016 |
| WO | 2016099640 | 6/2016 |

OTHER PUBLICATIONS

Int'l Search Report and Written Opinion for PCT/US2017/043509 dated Oct. 13, 2017.
(Continued)

*Primary Examiner* — Thien S Tran
(74) *Attorney, Agent, or Firm* — MCANDREWS HELD & MALLOY LTD.

(57) ABSTRACT

Induction heating extension cables including control conductors are disclosed. An example cable assembly includes: a first plurality of conductors in a Litz cable arrangement; an outer protective layer configured to protect the plurality of conductors from physical damage; and a second plurality of conductors that are electrically isolated from the first plurality of conductors and are protected by the outer protective layer from physical damage.

20 Claims, 3 Drawing Sheets

Related U.S. Application Data continuation-in-part of application No. 15/869,220, filed on Jan. 12, 2018, now Pat. No. 11,120,925.

(60) Provisional application No. 62/447,161, filed on Jan. 17, 2017.

(51) Int. Cl.
  *H01B 9/00* (2006.01)
  *H01B 9/02* (2006.01)
  *H04B 3/54* (2006.01)
  *H05B 6/10* (2006.01)

(52) U.S. Cl.
  CPC ............ *H04B 3/542* (2013.01); *H04B 3/546* (2013.01); *H05B 6/101* (2013.01); *H04B 2203/5487* (2013.01)

(56) References Cited

U.S. PATENT DOCUMENTS

| | | | | |
|---|---|---|---|---|
| 2006/0021787 | A1* | 2/2006 | Fetterolf, Sr. | H01B 9/003 174/113 R |
| 2006/0289495 | A1* | 12/2006 | Thomas | H05B 6/101 219/677 |
| 2007/0074891 | A1* | 4/2007 | Burke | H01B 7/06 174/128.1 |
| 2007/0080154 | A1 | 4/2007 | Ott | |
| 2015/0334780 | A1* | 11/2015 | Beistle | H05B 6/101 219/667 |
| 2017/0004902 | A1* | 1/2017 | Angermann | H01B 7/0208 |
| 2017/0252849 | A1* | 9/2017 | Ryan | B23K 9/235 |
| 2018/0049277 | A1 | 2/2018 | Salsich | |

OTHER PUBLICATIONS

Qian Ruzhu, et. al., "101 Kinds of Household Refrigerator Troubleshooting", Liaoning Science and Technology Press, May 31, 1992, pp. 390-391.

European Office Communication Appln No. 24151712.7 dated Mar. 1, 2024.

* cited by examiner

INDUCTION HEATING EXTENSION CABLES INCLUDING CONTROL CONDUCTORS

RELATED APPLICATIONS

This patent is a continuation-in-part of U.S. patent application Ser. No. 15/869,220, filed Jan. 12, 2018, entitled "INDUCTION HEATING EXTENSION CABLES INCLUDING CONTROL CONDUCTORS," which claims priority to U.S. Provisional Patent Application Ser. No. 62/447,161, filed Jan. 17, 2017, entitled "INDUCTION HEATING EXTENSION CABLES INCLUDING CONTROL CONDUCTORS." The entireties of U.S. Provisional Patent Application Ser. No. 62/447,161 is incorporated herein by reference.

BACKGROUND

Induction heating of workpieces to be welded, such as pipe, often involves arranging a fixture and/or one or more conductive cables in proximity to the workpiece. The power supply that provides induction heating power may be located a substantial distance from the workpiece and/or the fixture, such that measuring heating parameters directly at the power supply is not feasible.

SUMMARY

Induction heating extension cables including control conductors are disclosed, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1A:
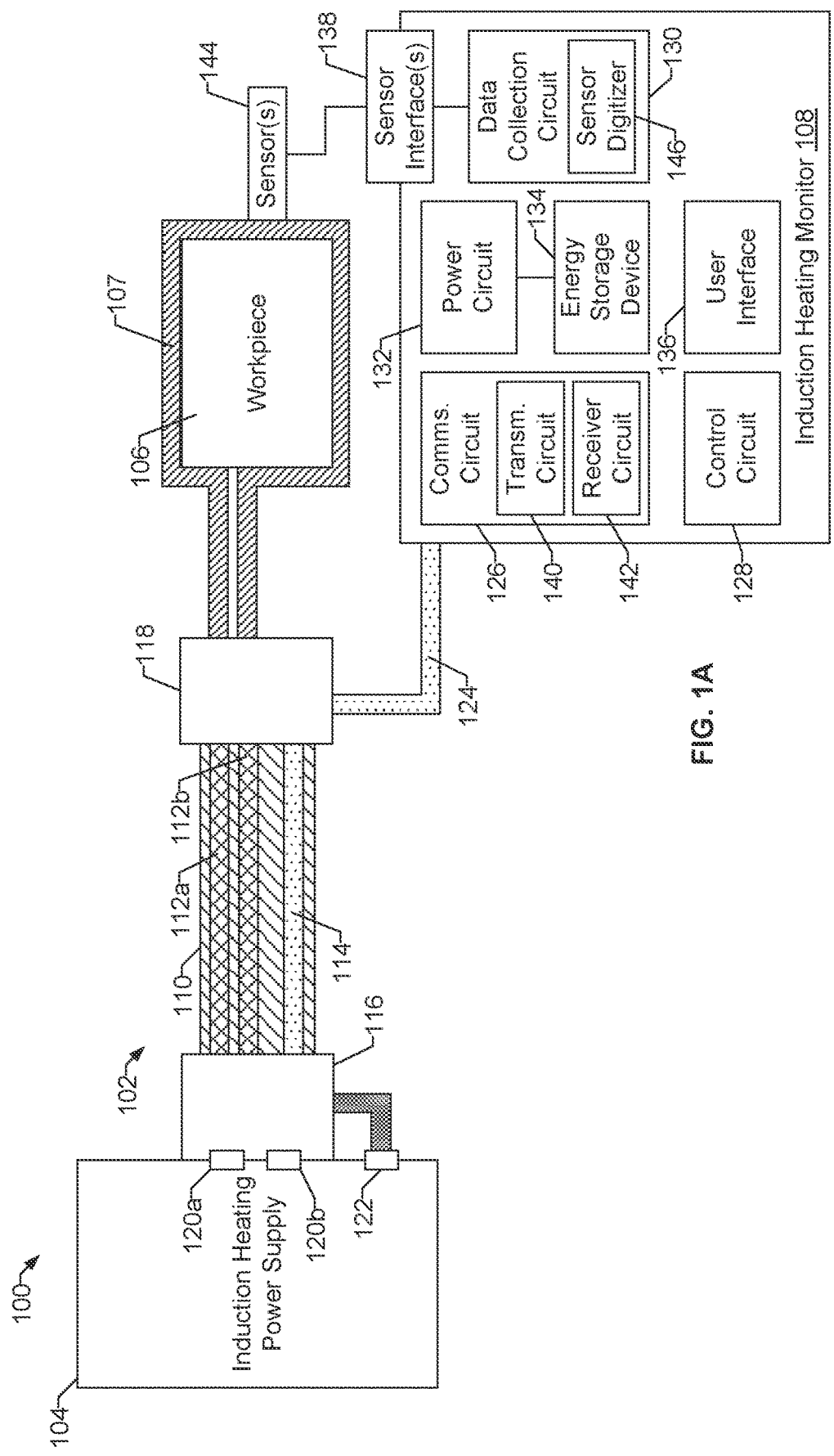
FIG. 1A is a block diagram of an example induction heating system including a cable assembly constructed in accordance with aspects of this disclosure.

Induction heating extension cables deliver induction heating current between an induction heating power supply (e.g., a power supply producing and/or converting induction heating currents) and an induction heating cable (e.g., a cable that is positioned proximate a workpiece such that the induction heating currents induce eddy currents within the workpiece). Induction heating extension cables may have the induction heating current-carrying conductors tightly coupled to reduce (e.g., minimize or eliminate) leakage and improve efficiency.

In contrast with conventional cables, disclosed example extension cables include an additional control cable that transfers data and/or power and that is contained within the outer protective layer of the extension cable (e.g., is not exterior to the extension cable). Disclosed example extension cables couple an induction heating power supply to a remote device, which may be located near the workpiece, to exchange data with the remote device and/or provide power to the remote device. Additionally, disclosed examples may omit electrical isolation measures that may be required when the data is electrically coupled to high-power heating conductors, while being protected by the relatively tough outer jacket or protective layer of the extension cable from physical damage that may occur in a welding-type environment.

Disclosed example cable assemblies include: a first plurality of conductors in a Litz cable arrangement, an outer protective layer configured to protect the first plurality of conductors from physical damage, and a second plurality of conductors that are electrically isolated from the first plurality of conductors and are protected by the outer protective layer from physical damage.

In some example cable assemblies, the second plurality of conductors include a twisted pair of wires. In some example cable assemblies, the second plurality of conductors include coaxial conductors. Some example cable assemblies further include a coupler to couple the first plurality of conductors to an induction heating cable and to couple the second plurality of conductors to an induction heating accessory. In some such examples, the second plurality of conductors conduct at least one of power or data between the induction heating accessory and an induction heating power supply.

In some examples, the first plurality of conductors are configured to conduct induction heating current. In some examples, the first plurality of conductors have a total cross-sectional area of at least 8.37 square millimeters, exclusive of electrical insulation. Some example cable assemblies further include a coupler to couple the first plurality of conductors to an induction heating power supply and to couple the second plurality of conductors to the induction heating power supply. In some such examples, the coupler couples the first plurality of conductors to power connectors of the induction heating power supply. In some examples, the coupler couples the second plurality of conductors to a communication connector of the induction heating power supply.

Disclosed example induction heating systems include an induction heating power supply, a monitoring device remote from the induction heating power supply, and a cable assembly. The cable assembly includes a first plurality of conductors in a Litz cable arrangement, an outer protective layer configured to protect the first plurality of conductors from physical damage, and a second plurality of conductors that are electrically isolated from the first plurality of conductors and are protected by the outer protective layer from physical damage.

In some examples, the second plurality of conductors comprise a twisted pair of wires. In some examples, the second plurality of conductors comprise coaxial conductors. Some example induction heating systems further include a coupler to couple the first plurality of conductors to an induction heating cable and to couple the second plurality of conductors to the monitoring device. In some such examples, the second plurality of conductors conduct at least one of power or data between the monitoring device and the induction heating power supply.

In some example induction heating systems, the first plurality of conductors conduct induction heating current. In some examples, the first plurality of conductors have a total cross-sectional area of at least 8.37 square millimeters, exclusive of electrical insulation. Some example induction heating systems further include a coupler to couple the first plurality of conductors to the induction heating power supply and to couple the second plurality of conductors to the induction heating power supply. In some such examples, the coupler couples the first plurality of conductors to power connectors of the induction heating power supply. In some examples, the coupler couples the second plurality of conductors to a communication connector of the induction heating power supply.

FIG. 1A is a block diagram of an example induction heating system 100 including a cable assembly 102. The heating system 100 includes an induction heating power supply 104 that provides heating power to a workpiece 106 via the cable assembly 102 and an induction heating cable 107. The system 100 further includes a induction heating monitor 108. The induction heating monitor 108 may be a monitoring device for monitoring the workpiece 106 and/or may be any other type of induction heating accessory.

The cable assembly 102 includes an outer protective layer 110, multiple conductors 112*a*, 112*b* in a Litz configuration, and a second set of two or more conductors 114. The Litz conductors 112*a*, 112*b* provide current to the heating cable 107. When the heating cable 107 are arranged proximate the workpiece 106 (e.g., wrapped around the workpiece 106, attached to a fixture configured to direct the current to the workpiece 106), the power supply 104 and the heating cable 107 induce Eddy currents into the workpiece 106 to inductively heat the workpiece 106. In some examples, each of the example Litz conductors 112*a*, 112*b* may have effective gauge equivalent to American Wire Gauge (AWG) 8 (e.g., a total cross-sectional area of at least 8.37 square millimeters, exclusive of the electrical insulation of the Litz conductors) or larger. In examples in which multiple Litz conductors are used to implement each of the Litz conductors 112*a*, 112*b*, the combination of Litz conductors used to implement each of the Litz conductors has an effective gauge equivalent to AWG 8 or larger (e.g., multiple conductors implementing the Litz conductor 112*a* have a combined total cross-sectional area of at least 8.37 square millimeters, exclusive of the electrical insulation of the Litz conductors, and multiple conductors implementing the Litz conductor 112*b* have a combined total cross-sectional area of at least 8.37 square millimeters). In still other examples, the combination of the Litz conductors 112*a*, 112*b* may have effective gauge equivalent to AWG 8 (e.g., each of the Litz conductors 112*a*, 112*b* may have a gauge equivalent less than AWG 8).

The second conductors 114 are contained within the outer protective layer 110 (e.g., an outer jacket) of the cable assembly 102, but is electrically isolated from the Litz conductors 112*a*, 112*b* so as to be isolated from the relatively high currents and/or voltages. The example outer protective layer 110 may be constructed using, for example, a thermoplastic polyester elastomer (e.g., Hytrel®), polyurethane and/or any other material and/or combination of materials that provides mechanical and electrical protection to the Litz conductors 112*a*, 112*b* and the second conductors 114. The second conductors 114 may deliver power to the induction heating monitor 108 and/or exchange data signals between the power supply 104 and the induction heating monitor 108. Example implementations of the second conductors 114 include one or more twisted pairs of conductors or one or more coaxial cables. Other implementations may also be used.

The example cable assembly 102 of FIG. 1A further includes a power supply coupler 116 and a heating cable coupler 118. The power supply coupler 116 couples the conductors 112*a*, 112*b* to power terminals 120*a*, 120*b* (e.g., positive and negative terminals) of the induction heating power supply 104 and/or couples the second conductors 114 to a communications terminal 122 of the induction heating power supply 104. The power terminals 120*a*, 120*b* may be studs that transmit the heating power for heating the workpiece 106 via the induction heating cable 107. The example induction heating power supply 104 may exchange data and/or provide power to the induction heating monitor 108 via the communications terminal 122. In some examples, the power terminals 120*a*, 120*b* and the communications terminal 122 are integrated into the same connector, to which the power supply coupler 116 may connect.

The heating cable coupler 118 couples the conductors 112*a*, 112*b* to the induction heating cable 107. The heating cable coupler 118 also couples the conductors 114 to the induction heating monitor 108 via external conductors 124. The external conductors 124 may be of the same type as the conductors 114 within the cable assembly 102. For example, if the conductors 114 include twisted pairs of wires, the external conductors 124 may also be twisted pairs of wires. The external conductors 124 may be replaceable so that the appropriate length of external conductors 124 can be used to position the induction heating monitor 108 in a desired location.

The example induction heating monitor 108 communicates with the induction heating power supply 104 via the conductors 114 of the cable assembly 102. As mentioned above, the conductors 114 are electrically isolated from the conductors 112*a*, 112*b* that carry the induction heating power, and the conductors 114 and the conductors 112*a*, 112*b* are contained within an outer protective layer 110 of the cable assembly 102. In the example of FIG. 1A, the induction heating monitor 108 communicates and/or receives power via the conductors 114 within an extension cable. However, the conductors 114 may also be included at least partially within the heating cable 107.

The induction heating monitor 108 includes a communications circuit 126, a control circuit 128, a data collection circuit 130, a power circuit 132, an energy storage device 134, a user interface 136, and sensor interface(s) 138. The example communications circuit 126 includes a transmitter circuit 140 and a receiver circuit 142.

The example transmitter circuit 140 transmits the induction heating data to the induction heating power supply 104 via the conductors 114 via the external conductors 124 and the heating cable coupler 118. The example receiver circuit 142 may receive data from the induction heating power supply 104. The induction heating power supply 104 may include similar communication circuitry, including transmitter circuitry and/or receiver circuitry, to receive induction heating data and/or transmit configuration data to the induction heating monitor 108. In some examples, the induction heating power supply 104 modifies an induction heating output (e.g., induction heating power, etc.) based on the induction heating data received from the induction heating monitor 108 via the conductors 114.

The transmitter circuit 140 frames induction heating data for transmission via the conductors 114. The induction heating data may be generated from sensor data collected by one or more sensors 144 via the sensor interface(s) 138 and/or the data collection circuit 130. The data collection circuit 130 may include sensor digitizer(s) 146 to digitize data received from the sensor(s) 144. The induction heating data may be converted to digital data via the sensor digitizer 146 and/or input by a user or operator via the user interface 136.

The example sensor(s) 144 may include a temperature sensor (e.g., a thermocouple, a thermistor, a resistive temperature device, an infrared sensor, a semiconductor-based temperature sensor, etc.), a coolant pressure sensor, or a coolant flow sensor, and/or a location sensor. Example induction heating data includes one or more of an ambient temperature at the workpiece 106 being heated with the induction heating cable 107, a temperature of the induction heating cable 107, a temperature of a blanket in contact with the induction heating cable 107, a temperature of the workpiece 106, a measurement of current flowing through the induction heating cable 107, a voltage measurement of a voltage at the induction heating cable 107 (e.g., a voltage across the portion of the induction heating cable 107 inductively coupled to the workpiece 106), an error signal, a temperature of coolant flowing through the induction heating cable 107, a coolant pressure, a coolant flow rate, a workpiece identifier, an induction heating cable identifier, an operator identifier, date information, time information, geographic information, a cable fixture identifier, and/or any type of operator or user input entered at the induction heating monitor 108.

The power circuit 132 extracts power from the conductors 114, 124, which may be multiplexed with data signals. The power circuit 132 provides power to the data collection circuit 130, the sensors 144 (e.g., via the sensor interface(s) 138), the control circuit 128, the user interface 136, and/or the communications circuit 126. Additionally or alternatively, the power circuit may charge the energy storage device 134. The example energy storage device 134 provides power to the data collection circuit 130, the sensors 144 (e.g., via the sensor interface(s) 138), the control circuit 128, the user interface 136, and/or the communications circuit 126 when the power circuit 132 is not capable of powering the components. The example energy storage device 134 may include one or more batteries, one or more capacitors, and/or any other type of energy storage device.

The example user interface 136 may include any type(s) of user interface devices, such as selection buttons, switches, dials, number pads, touchscreens, and/or any other type of user interface device.

Figure 1B:
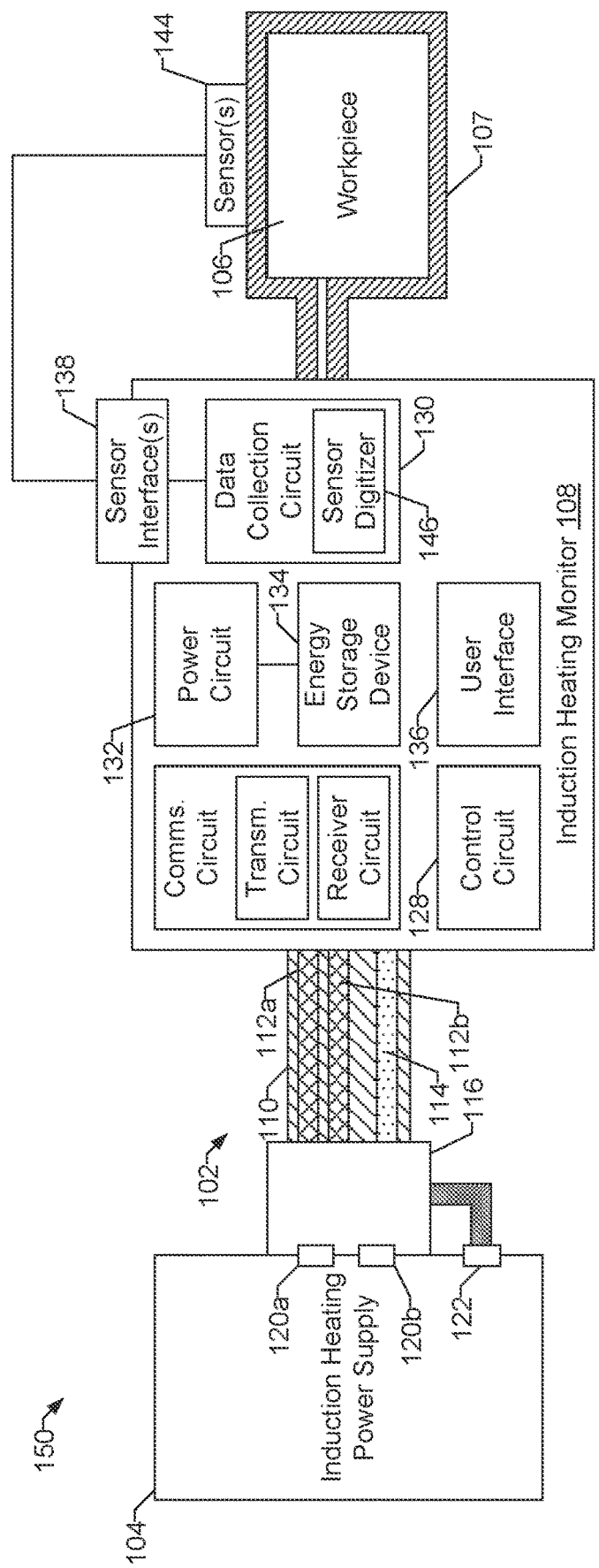
FIG. 1B is a block diagram of another example induction heating system, in accordance with aspects of this disclosure.

FIG. 1B is a block diagram of another example induction heating system 150. The induction heating system 150 of FIG. 1B is similar to the induction heating system 100 of FIG. 1A, and includes the cable assembly 102, the induction heating power supply 104, the workpiece 106, the induction heating cable 107, the induction heating monitor 108, the outer protective layer 110, the conductors 112a, 112b in the Litz configuration, the second set of two or more conductors 114, the power supply coupler 116, the power terminals 120a, 120b, and the communications terminal 122.

In contrast with the example system 100 of FIG. 1A, the example system 150 couples the cable assembly 102 to the induction heating monitor 108 instead of a heating cable coupler 118. The example induction heating monitor 108 receives the power and/or data via the second conductors 114 (e.g., by terminating the second conductors 114). The induction heating monitor 108 of FIG. 1B passes the heating power from the conductors 112a, 112b through to the heating cable 107. In some examples, the induction heating monitor 108 may include connectors and/or terminations for the conductors 112a, 112b and for the heating cable 107, and include passthrough conductors to connect the conductors 112a, 112b and the heating cable 107.

The example induction heating monitor 108 of FIG. 1B includes the communications circuit 126, the control circuit 128, the data collection circuit 130, the power circuit 132, the energy storage device 134, the user interface 136, and the sensor interface(s) 138. The induction heating monitor 108 collects induction heating data from one or more sensor(s) 144.

While example couplers 116, 118 are disclosed, the example cable assembly 102 may be coupled to the induction heating power supply 104, the heating cable 107, and/or the induction heating monitor 108 using any combination and/or types of couplers and/or hard wiring.

Figure 2:
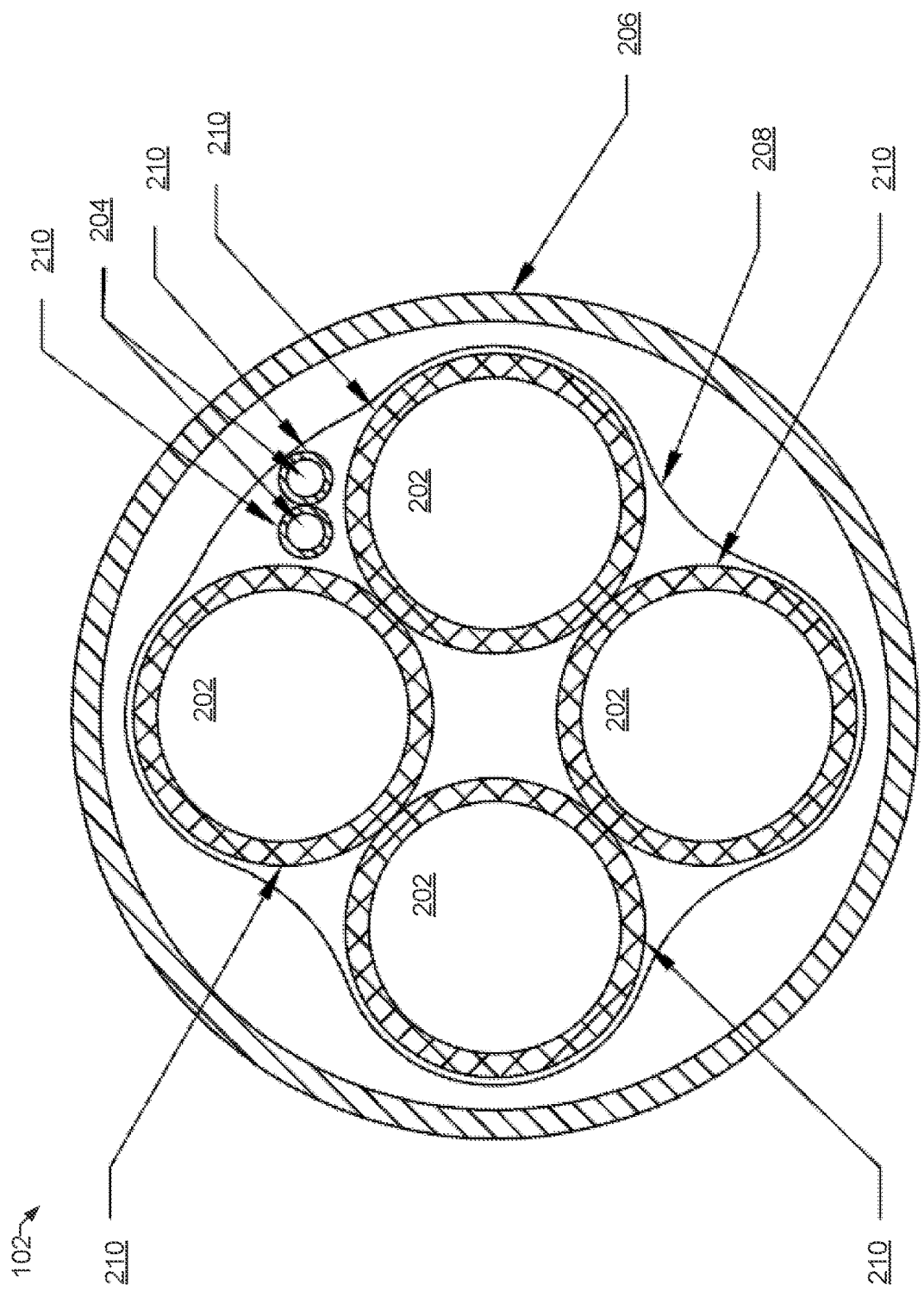
FIG. 2 is an example implementation of the cable assembly of FIGS. 1A and/or 1B.

FIG. 2 is an example implementation of the cable assembly 102 of FIGS. 1A and/or 1B. The example cable assembly 102 includes four Litz wire bundles 202, two conductors 204 arranged in a twisted pair configuration, an outer jacket 206, and an internal wrap 208. Each of the Litz wire bundles 202 and the conductors 204 include an additional jacket 210, which may be constructed of a thermoplastic elastomer (TPE). The example outer jacket 206 is constructed of a thermoplastic polyester elastomer (e.g., Hytrel®), polyurethane and/or any other material and/or combination of materials that provides mechanical and electrical protection to the Litz wire bundles 202 and the conductors 204. The internal wrap 208 may be constructed using polytetrafluoroethylene (PTFE) tape.

As shown in FIG. 2, the outer jacket 206 provides an outer protective layer that protects the Litz wire bundles 202 and the twisted pair conductors 204 from physical damage.

As utilized herein, "and/or" means any one or more of the items in the list joined by "and/or". As an example, "x and/or y" means any element of the three-element set {(x), (y), (x,y)}. In other words, "x and/or y" means "one or both of (x,y)". As another example, "x, y, and/or z" means any element of the seven-element set {(x), (y), (z), (x,y), (x,z), (y,z), (x,y,z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, blocks and/or components of disclosed examples may be combined, divided, re-arranged, and/or otherwise modified. Therefore, it is intended that the present method and/or system not be limited to the particular implementations disclosed, but that the present method and/or system will include all implementations falling within the scope of the appended claims, both literally and under the doctrine of equivalents.

What is claimed is:

1. An induction heating monitoring system, comprising:
   an induction heating monitor comprising a data collection circuit configured to collect induction heating data associated with an induction heating operation performed using an induction heating power supply; and
   a cable data coupler comprising one or more external conductors, wherein the cable data coupler is configured to:
   pass through induction heating power received via one or more first conductors within an outer jacket of an induction heating cable; and
   couple the induction heating monitor to one or more second conductors within the outer jacket of the induction heating cable to transmit the induction heating data to the induction heating power supply, wherein the one or more external conductors are configured to couple the induction heating monitor to the one or more second conductors.

2. The apparatus as defined in claim 1, wherein the induction heating cable comprises an extension cable configured to conduct current between the induction heating power supply and an induction heating coil.

3. The apparatus as defined in claim 1, wherein the induction heating monitor further comprises at least one of:
a transmitter circuit configured to transmit the induction heating data to the induction heating power supply; or
a receiver circuit configured to receive configuration data from the induction heating power supply.

4. The apparatus as defined in claim 3, further comprising a power circuit configured to receive power via the one or more first conductors and to provide power to the data collection circuit.

5. The apparatus as defined in claim 3, further comprising a sensor interface configured to receive data from a sensor.

6. The apparatus as defined in claim 5, wherein the data collection circuit further comprises a sensor digitizer configured to digitize the data received from the sensor.

7. The apparatus as defined in claim 5, wherein the sensor interface is configured to receive the data from at least one of a thermocouple, a thermistor, a resistance temperature detector, an infrared sensor, a semiconductor-based temperature sensor, a pressure sensor, a flow sensor, or a location sensor.

8. The apparatus as defined in claim 1, wherein:
the cable data coupler comprises first terminations configured to be coupled to the one or more first conductors and second terminations coupled to the first terminations to be coupled to at least one of an induction heating extension cable or an induction heating blanket; and
the cable data coupler receives the induction heating power from the one or more first conductors, via the first terminations, and transmits the induction heating power, via the second terminations, directly to either or both of the induction heating extension cable or the induction heating blanket.

9. The apparatus as defined in claim 1, wherein the one or more first conductors comprise Litz wire.

10. An induction heating system, comprising:
an induction heating power supply;
a cable assembly, comprising:
  a first plurality of conductors in a Litz cable arrangement;
  an outer protective layer configured to protect the first plurality of conductors from physical damage; and
  a second plurality of conductors that are electrically isolated from the first plurality of conductors and are protected by the outer protective layer from physical damage;
an induction heating monitor comprising a data collection circuit configured to collect induction heating data associated with an induction heating operation performed using the induction heating power supply; and
a cable data coupler comprising a plurality of external conductors, wherein the cable data coupler is configured to:
  pass through induction heating power received via the first plurality of conductors within an outer jacket of an induction heating cable; and
  couple the induction heating monitor to the second plurality of conductors within the outer jacket of the induction heating cable to transmit the induction heating data to the induction heating power supply, wherein each external conductor of the plurality of external conductors are configured to couple the induction heating monitor to one or more conductors of the second plurality of conductors.

11. The induction heating system as defined in claim 10, wherein the induction heating cable comprises an extension cable configured to conduct current between the induction heating power supply and an induction heating coil.

12. The induction heating system as defined in claim 10, wherein the induction heating monitor further comprises a communication circuit configured to transmit the induction heating data via the second plurality of conductors.

13. The induction heating system as defined in claim 12, further comprising a power circuit configured to receive power via the second plurality of conductors and to provide power to the data collection circuit.

14. The induction heating system as defined in claim 12, further comprising a sensor, the data collection circuit comprising a sensor interface configured to receive data from the sensor.

15. The induction heating system as defined in claim 14, wherein the data collection circuit further comprises a sensor digitizer configured to digitize the data received from the sensor.

16. The induction heating system as defined in claim 12, wherein the induction heating power supply is configured to modify an induction heating output based on the induction heating data.

17. The induction heating system as defined in claim 10, wherein the second plurality of conductors comprises at least one of a twisted pair of wires or a coaxial cable.

18. An induction heating monitoring system, comprising:
an induction heating monitor comprising a data collection circuit configured to collect induction heating data associated with an induction heating operation performed using an induction heating power supply; and
a cable assembly comprising one or more external conductors, wherein the cable data coupler is configured to:
  pass through induction heating power received via one or more first conductors within an outer jacket of a cable assembly; and
  transmit induction heating data to the induction heating power supply via one or more second conductors within the outer jacket of the cable assembly, wherein the one or more external conductors are configured to couple the induction heating monitor to the second one or more conductors.

19. The induction heating monitoring system of claim 18, wherein the induction heating monitor is configured to couple the cable assembly to an induction heating cable.

20. The induction heating monitoring system of claim 19, wherein the induction heating monitor further comprises at least one of:
a transmitter circuit configured to transmit the induction heating data to the induction heating power supply; or
a receiver circuit configured to receive configuration data from the induction heating power supply.

* * * * *